Patented Apr. 12, 1949

2,467,013

UNITED STATES PATENT OFFICE 2,467,013

PROCESS FOR THE MANUFACTURE OF VINYL CHLORIDE

Alfred Jean Denis Henri Marie de Vaissière, Paris, France, assignor to Societe Anonyme des Manufactures des Glaces et Produits Chimiques de Saint-Gobain, Chauny & Cirey, Paris, France No Drawing. Application September 10, 1945, Serial No. 615,509. In France December 7, 1942

Section 1, Public Law 690, August 8, 1946
Patent expires December 7, 1962

1 Claim. (Cl. 260—656)

This invention relates to the preparation of vinyl chloride by the passage of a mixture of acetylene and hydrochloric acid over a catalytic mass.

It has been proposed to use as the catalytic mass porous materials impregnated with mercury salts. However, the mercury compounds that have been suggested up to the present for producing the best results have, on the one hand, the drawback of necessitating a comparatively high temperature for the reaction, of the order of 150–200° C., and, on the other hand, the disadvantage that they are progressively disengaged from their support by sublimation so that the activity of the catalytic mass rapidly diminishes and the yield of the catalyst, which initially is remarkable, soon ceases to meet the requirements.

Such drawbacks are particularly marked when using mercuric chloride which is the mercury salt most frequently proposed up to the present. It is for this reason that attempts have been made to carry out the manufacture of vinyl chloride with the aid of catalysts other than mercury salts.

I have found that the disadvantages encountered in the use of mercury salts as catalysts are not inherent to the presence of mercury and that it is possible to use as a catalyst a mercury salt which, whilst possessing the excellent catalytic properties of mercury, does not suffer from the defects pointed out above.

My invention consists in the use as a catalyst of a particular mercury salt, namely, mercury vanadate. In practice, the mercuric vanadate is incorporated into active carbon. The catalytic mass may be prepared, for example, by the successive impregnations of the active carbon, first with a solution of ammonium metavanadate and then with a solution of mercuric chloride.

The advantageous properties of the new catalyst, in particular from the point of view of its stability on its support, are such that even when the degree of impregnation of the active carbon is reduced by one half, compared with what has hitherto been done with other mercury salts, better results are obtained with the mercuric vanadate. Thus, if 10% of mercuric vanadate be used instead of 20% of mercuric chloride, there can be obtained a catalysis rate of 99.6% whilst only working at a temperature of about 100° C., that is to say, at a temperature well below that required for mercuric chloride and which again contributes to ensuring to the catalyst a greatly extended period of service. Furthermore, mercuric vanadate withstands much better any increases of temperature which may be accidentally produced in the course of the reaction. The catalysis therefore takes place in its entirety under conditions such that the utilisation of the catalyst is a commercial proposition.

In executing the process for the manufacture of vinyl chloride, a mixture of acetylene and hydrochloric acid in reactive proportions is passed over a catalyst mass constituted by mercuric vanadate incorporated in active carbon. The temperature is maintained at about 100° C.

The mercuric vanadate was made by first impregnating active carbon with a vanadium compound and thereafter with a mercury salt adapted to react with it. The mercury salt was mercuric chloride, and ammonium meta vanadate was reacted with it within the active carbon.

What is claimed is:

In a process for the manufacture of vinyl chloride, causing a mixture of acetylene and hydrochloric acid to pass over a catalyst constituted by mercuric vanadate, the catalysis taking place at a temperature of about 100° C.

ALFRED JEAN DENIS HENRI
MARIE DE VAISSIÈRE.

REFERENCES CITED

The following references are of record in the file of this patent:

UNITED STATES PATENTS

| Number | Name | Date |
|---|---|---|
| 1,519,470 | Wilson | Dec. 16, 1924 |
| 1,919,886 | Hermann et al. | July 25, 1933 |

OTHER REFERENCES

Mellor: "Comprehensive Treatise on Inorganic and Theoretical Chemistry," Vol. 9, page 774.